United States Patent [19]

Zuckerwar et al.

[11] Patent Number: 4,770,038

[45] Date of Patent: Sep. 13, 1988

[54] ULTRASONIC DEPTH GAUGE FOR LIQUIDS UNDER HIGH PRESSURE

[75] Inventors: Allan J. Zuckerwar, Newport News; David S. Mazel, Norfolk, both of Va.

[73] Assignee: The United States of America as represented by the Administrator of National Aeronautics and Space Administration, Washington, D.C.

[21] Appl. No.: 829,042

[22] Filed: Feb. 13, 1986

[51] Int. Cl.$^4$ ............................................. G01F 23/28
[52] U.S. Cl. ................................ 73/290 V; 310/338; 367/908
[58] Field of Search ..................... 73/290 V; 340/621; 367/908; 310/338

[56] References Cited

U.S. PATENT DOCUMENTS

| 3,019,650 | 2/1962 | Worswick | 73/290 V |
|---|---|---|---|
| 3,100,885 | 8/1963 | Welkowitz et al. | 73/290 V |
| 3,214,974 | 11/1965 | Altman et al. | 73/290 V |
| 3,266,311 | 8/1966 | Andreasen et al. | 73/290 V |
| 3,561,831 | 2/1971 | Alibert et al. | 310/338 |
| 3,771,117 | 11/1973 | Shaffer et al. | 73/861.27 X |
| 3,777,192 | 12/1973 | Barrow | 310/338 X |
| 4,107,994 | 8/1978 | Sogo | 73/290 V |
| 4,183,007 | 1/1980 | Baird | 73/290 V |
| 4,462,247 | 7/1984 | Hattori et al. | 73/756 X |
| 4,556,814 | 12/1985 | Ito et al. | 73/644 X |
| 4,570,483 | 2/1986 | Sobue | 73/290 V |
| 4,580,448 | 4/1986 | Skrgatic | 73/290 V |

FOREIGN PATENT DOCUMENTS

| 3241033 | 5/1984 | Fed. Rep. of Germany | 73/290 V |
|---|---|---|---|
| 187227 | 10/1984 | Japan | 73/290 V |

Primary Examiner—Daniel M. Yasich
Attorney, Agent, or Firm—George F. Helfrich; John R. Manning; Charles E. B. Glenn

[57] ABSTRACT

An ultrasonic depth gauge 20 for liquids under high pressure is comprised of a transducer assembly 21 and a supporting electronics unit 22. The transducer assembly is mounted into the bottom wall of a storage vessel 12 with its resonating surface directly exposed to the highly pressurized liquid 13 in the vessel. The transducer assembly consists of a conventional transducer element 38 rigidly bonded to the inside wall of a bored out conventional high-pressure plug 30 thereby forming a composite resonator 50. The element and the plug wall resonate as one upon electrical excitation of the element while the transducer element is completely shielded from any exposure to the liquid under high pressure. The composite resonator sends a vibration up to the surface of the liquid where it is reflected back to the composite resonator. The supporting electronics unit measures the vibration round-trip transit time which is proportional to the depth 15 of the liquid.

9 Claims, 3 Drawing Sheets

ULTRASONIC DEPTH GAUGE FOR LIQUIDS UNDER HIGH PRESSURE

ORIGIN OF THE INVENTION

The invention described herein was made jointly in the performance of work under NASA Contract No. NAS1-17099 with Old Dominion University and an employee of the United States Government. In accordance with 35 USC 202, the contractor elected not to retain title.

BACKGROUND OF THE INVENTION

This invention relates generally to gauges and in particular to an ultrasonic depth gauge for liquids under high pressure.

In certain applications it is desirable or necessary to use a pressurized gas to transfer a liquid from one location to another; for example, to transfer cryogenic liquids from a holding vessel to a rocket engine, or to transfer cooling water from a storage vessel to components situated in a high-temperature environment. Conventional instrumentation to measure liquid depth does not have the capability to operate under the extreme pressures which prevail in many such liquid transfer systems.

Prior methods of liquid level sensing operated on one of four principles: (1) floats, (2) conductances (resistances), (3) ultrasonics or (4) hydrostatic pressures. The float type indicator has a float in contact with the liquid. As the liquid level varies, the float moves along a sensing device which indicates the liquid level. The conductance (or resistance) type of sensor has probes, which contact the liquid at a certain height. When the liquid contacts the probes, an electric circuit is completed indicating the liquid level. The ultrasonic sensor works in one of two ways. With the first method, the liquid fills a gap between a ultrasonic transmitter and reflector at a certain level. The ultrasonic transmission propagates to and from the reflector when the gap is filled by the liquid. The second method involves measuring the time required for an ultrasonic pulse to propagate from a transducer through the gas above the liquid, to the surface of the liquid, and back to the transducer. The transmit time is proportional to the height of the liquid. However, none of the above systems are suitable for measuring the depth of a liquid under extremely high gas pressurization (ie: exceeding 3000 p.s.i.).

The fourth method uses hydrostatic pressure to measure the level of a liquid. The pressure at a particular point of a liquid varies with the height of the liquid above that point. Thus, measuring the pressure at the bottom of a liquid indicates the height of the liquid. Generally, however, the hydrostatic pressure type suffers a limitation too. When a liquid is pressurized, the hydrostatic device will yield a false indication of liquid depth.

Thus, it is the object of the present invention to provide a method and apparatus to accurately and continuously measure the depth of a liquid subjected to extremely high gas pressurization.

It is a further object of the present invention to employ a depth gauge apparatus that is impervious to extreme high pressures.

Other objects and advantages of the present invention will be readily apparent from the following description and drawings which illustrate a preferred embodiment of the present invention.

SUMMARY OF THE INVENTION

An ultrasonic depth gauge assembly for liquids under high pressure is comprised of a transducer assembly and a supporting electronics unit. The transducer assembly is mounted into the bottom wall of a storage vessel with its resonating surface directly exposed to the highly pressurized liquid in the vessel. The transducer assembly consists of a conventional transducer element rigidly bonded to the inside wall of a bored out conventional high-pressure plug whereby the transducer element is completely shielded from any exposure to the liquid under high gas pressurization. The plug wall protects the transducer element from the high pressure in the vessel while providing a resonating surface in direct contact with the liquid. The element and the plug wall, to which the element is bonded thereto, act as a composite resonator upon electrical impulse excitation of the transducer element. The element and plug wall resonate as one causing an ultrasonic pulse to emanate from the resonating surface directly into the liquid.

The ultrasonic pulse propagates upward through the liquid to the liquid-gas interface in the storage vessel. When the ultrasonic echo returns from the liquid-gas interface, it re-excites the composite resonator into vibration. The supporting electronics unit measures the round-trip transit time for the ultrasonic pulse and its return echo to traverse the depth of the liquid. The time measured is proportional to the depth of the highly pressurized liquid.

DETAILED DESCRIPTION OF THE INVENTION

Figure 1:
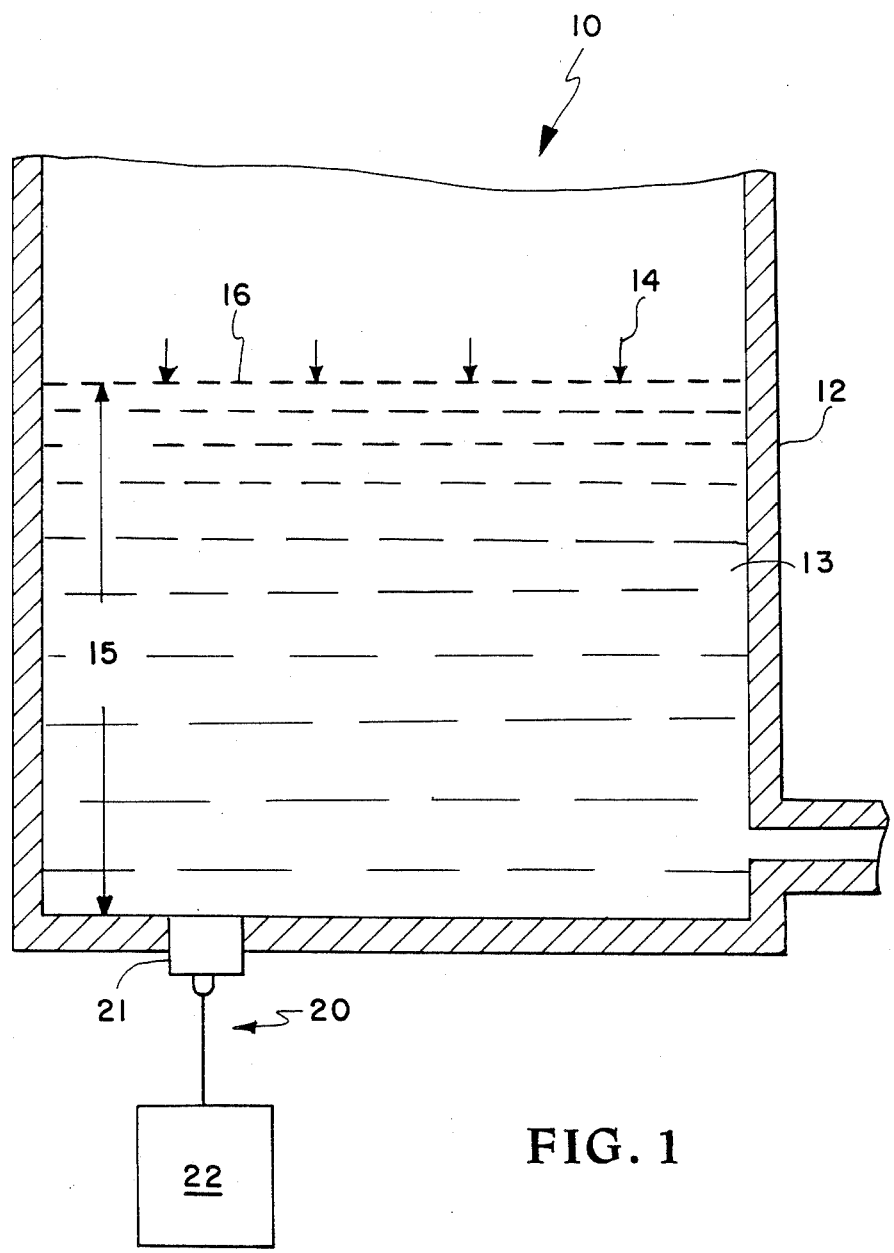
FIG. 1 is a cross-sectional schematic of a storage vessel containing liquid under high pressure with an ultrasonic depth gauge assembly installed in the vessel base according to the present invention.

Referring now more particularly to an embodiment of the invention selected for illustration in the drawings, FIG. 1 shows a cross-section of the basic components of a system utilizing the invention designated generally by 10. A storage vessel 12 contains a stored liquid 13 subjected to from above by a pressurizing gas as indicated by the arrows 14. The pressurizing gas maintains the pressure of liquid 13 at a very high level (ie: more than 3000 p.s.i.). Such high pressure is required, for example, to transfer cryogenic liquids from a holding vessel to a rocket engine. The ultrasonic depth gauge assembly, as indicated generally by 20, is comprised of a transducer assembly 21 and a supporting electronics unit 22.

Figure 2:
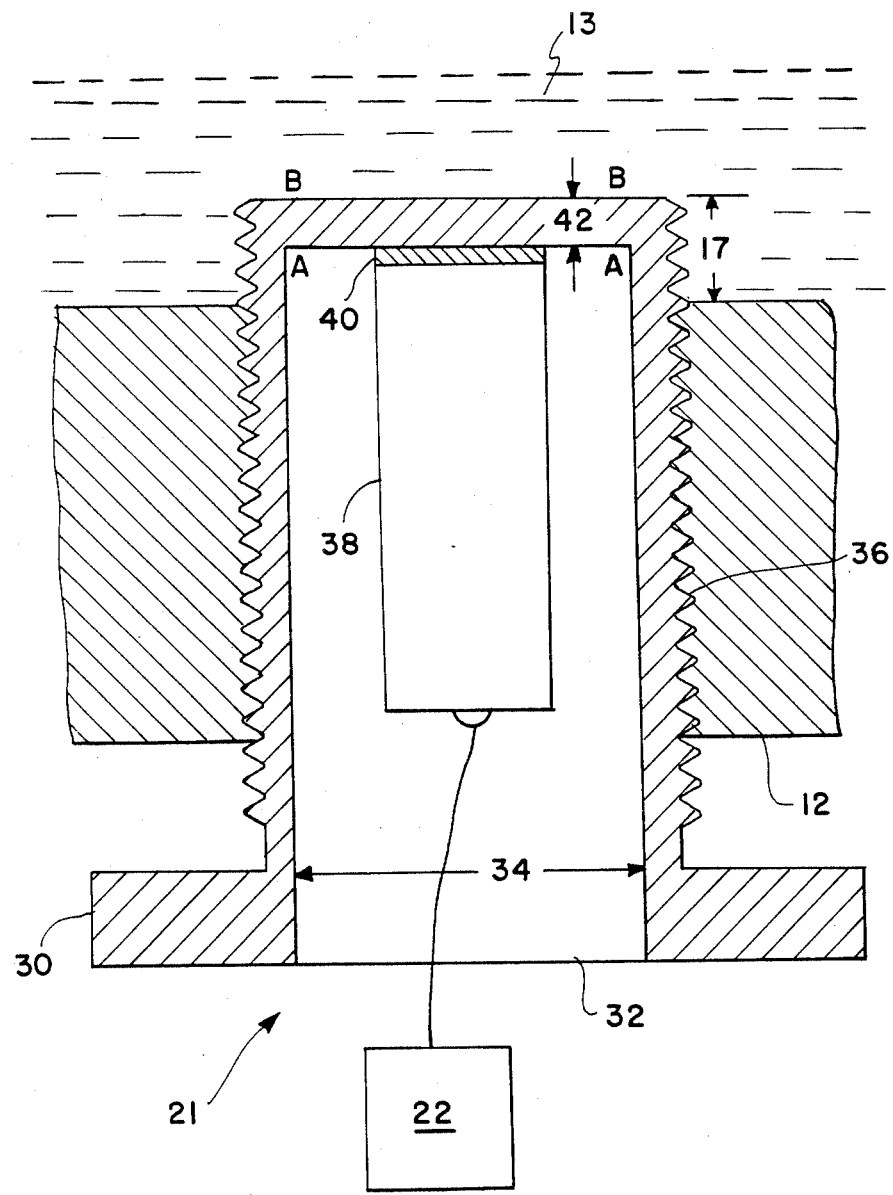
FIG. 2 is a cross-sectional view of the transducer assembly portion of the ultrasonic depth gauge assembly according to the present invention.

A cross-section of transducer assembly 21, designed to withstand the extreme pressures imposed upon stored liquid 13, is shown in FIG. 2. A flat-bottom hole 32 is bored into a conventional high-pressure plug 30 per specification (eg: American National Standards Institute B16.11-1973, Forged Steel Fittings, Socket Welding, and Threaded Standard) to a depth leaving a remaining plug wall, designated by the area between surfaces A—A and B—B of a thickness 42, sufficient to withstand the extreme pressures per specification (eg: American Society of Mechanical Engineers Code for Pressure Piping B31, 1980 Edition). For illustration, if the hole diameter 34 is 7/16 inch and the operating pressure is 6000 p.s.i., then the plug wall thickness 42 between surfaces A—A and B—B must be at least ⅛ inch to meet the above-mentioned ANSI code. The plug 30 is screwed into the base of the wall of storage vessel 12. The threads 36 and vessel wall 12 form the primary pressure seal. The exterior surface of the plug wall indicated by surface B—B is exposed to the pressurized liquid 13. The interior surface indicated by A—A has a conventional piezoelectric element 38 rigidly bonded to it by means of a bonding agent 40. A suitable bonding agent is M-bond GS-2, manufactured by Micro-Measurements, Inc. The element 38 is accessible from the outside of storage vessel 12 to permit electrical connection to the supporting electronics unit 22. Without the protection of the plug wall thickness 42, element 38 would fail at pressure levels far inferior to the rated levels of the high pressure plug 30. However, in the present invention, element 38 is protected from the high pressure by the plug wall thickness 42.

The principle of measurement is based upon the round-trip transit time of an ultrasonic pulse propagating up from assembly 21 through the depth 15, as shown in FIG. 1, of liquid 13 and back to assembly 21. Transducer assembly 21, upon excitation by supporting electronics unit 22, launches an ultrasonic pulse into liquid 13. The ultrasonic pulse propagates up to the liquid-gas interface 16, where it suffers reflection and returns to transducer assembly 21. Here the pulse is converted back into an analog electric pulse, which is detected by electronics unit 22. Unit 22 provides a readout of the round-trip transit time between the transmitted and received pulses. From the measured round-trip transit time T and from the known sound velocity V of liquid 13, the depth H (also indicated by 15) of liquid 13 can be computed from the formula $$H = \frac{V \cdot T}{2} + K.$$

K is an offset equivalent to the height 17, as shown in FIG. 2, that plug 30 protrudes through the wall of vessel 12. Height 17 is not critical and is generally only a characteristic of the type of plug used or method of sealing the plug into the wall of the vessel.

Figure 3:
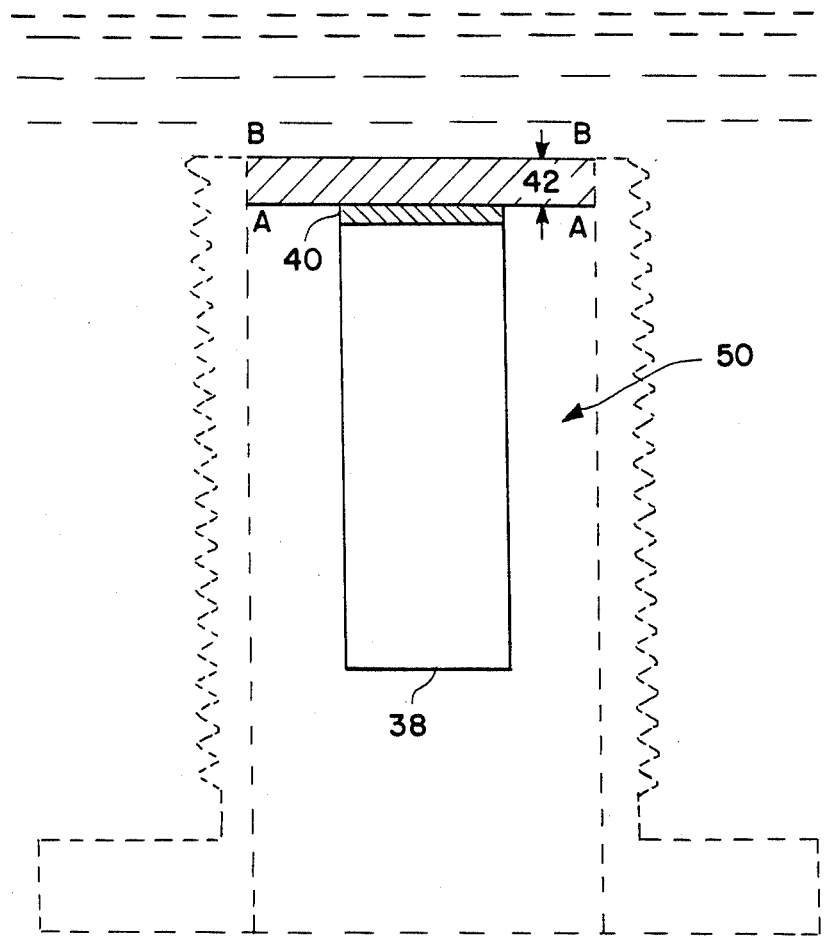
FIG. 3 is a cross-sectional view of the transducer assembly highlighting the portion of the assembly that acts as a composite resonator according to the present invention.

In operation, supporting electronics unit 22 provides a series of electrical impulses of high voltage (typically 350 V) for a brief duration (typically 20 nanoseconds) to excite piezoelectric element 38. Element 38 then excites the plug wall thickness 42 between surfaces A—A and B—B, hereinafter referred to as vibrating plate A—A—B—B, into a plate vibration, whereby element 38 and vibrating plate A—A—B—B vibrate together as a composite resonator designated generally by 50, the solid lines in FIG. 3. The frequencies of vibration for composite resonator 50 are essentially the natural frequencies of vibrating plate A—A—B—B, loaded slightly by the mass of element 38 and liquid 13, and are much lower than those of element 38 itself. For example, in the prototype invention, the fundamental frequency of vibration is 10 MHz for the isolated element 38 but 175 kHz for composite resonator 50.

Several alternate embodiments of the present invention are possible. The threads of the high-pressure plug may be replaced by an O-ring, gasket, cement, or other bonding agent, solder, weld, or any other means of forming a high-pressure seal to the wall of the storage vessel; or the plug may be eliminated altogether, if the flat-bottom hole is fabricated in the wall of the vessel itself. The vibrating surface in contact with the liquid may assume any geometrical form or enlist any vibrational modes which will successfully transmit the vibration to the liquid. For example, the piezoelectric element may be replaced by a magnetic, eletrostatic, pneumatic, magnetostrictive, electrodynamic, or any other transducer that will convert an electrical excitation into a mechanical force, and conversely. Furthermore, a buffer rod, made of a suitable material like fused quartz, can be inserted between the piezoelectric element and plug wall for operation in liquids at high temperatures, e.g. molten metals. Finally, the piezoelectric element can be fitted with a means of external cooling for operation at high temperatures.

The advantages of the present invention are numerous. The wall of the high-pressure plug protects the transducer element thereby allowing the invention to be used at much higher levels of gas pressurization then all other depth gauges. The resonating surface, being in direct contact with the liquid, is not required to transmit ultrasound through a gas above the liquid surface, as is the case in many prior ultrasonic depth gauges. This features enhances signal strength, accuracy, and range. The invention can be used with any chemically compatible liquid capable of sustaining ultrasonic propagation. Finally, the invention, with modification, lends itself to operation at high temperatures, e.g. molten metals.

The new feature of the invention is the configuration of the transducer assembly in the form of a composite resonator. The wall of the high-pressure plug, excited into the vibrational modes of a plate, transmits the ultrasonic vibration directly into the liquid and thereby protects the piezoelectric or other exciting element from the high pressures imposed upon the liquid.

What is claimed is:

1. An active method of continuous measurement of the depth of a liquid maintained at a pressure of at least 3000 pounds per square inch in a storage vessel comprising the steps of:
    providing a composite resonator as part of a transducer assembly bonded in a high pressure plug, said plug having tapered threads providing a pressure seal in the base of the storage vessel wherein the resonating surface of the composite resonator is exposed to the liquid and is impervious to pressures in excess of 3000 pounds per square inch;
    exciting the composite resonator wherein the resonating surface transmits a vibration directly into the liquid under high pressure; and
    measuring the round-trip transit time for the vibration to propagate up from the resonating surface to the surface of the liquid and then to reflect back to the resonating surface wherein the round-trip transit time is proportional to the depth of the liquid under high pressure.

2. A method according to claim 1 wherein the resonating surface of the composite resonator impervious to pressures in excess of 3000 pounds per square inch serves as a high pressure protective covering for an exciting resonator means which is rigidly bonded to the resonating surface.

3. A method as in claim 2 wherein the exciting resonator means and the resonating surface which is rigidly bonded thereto vibrate as one upon excitation of the exciting resonator means and wherein the exciting resonator means rigidly bonded to the resonating surface serves as the composite resonator.

4. A method according to claim 1 wherein a transducer assembly is employed and wherein the composite resonator serves as an ultrasonic transmitter and ultrasonic sensor for the purpose of respectively transmitting the vibration up to the surface of the liquid and detecting the reflection of the vibration from the surface of the liquid.

5. A self-contained composite ultrasonic gauge for providing active continuous measurement of the depth of a liquid maintained at a pressure of at least 3000 pounds per square inch in a storage vessel comprising:
   a composite resonating means for transmitting an ultrasonic vibration directly into said liquid from the base of said storage vessel, said resonating means being bonded in a high pressure plug, said plug having tapered threads providing a pressure seal in the base of said storage vessel; and a means for measuring the round-trip transit time for said vibration to propagate up to the surface of said liquid and reflect back to said composite resonating means wherein said round-trip transit time is proportional to the depth of said liquid.

6. An ultrasonic gauge as in claim 5 wherein said composite resonating means for transmitting includes a composite resonator as part of a transducer assembly sealed in the base of said storage vessel.

7. An ultrasonic gauge as in claim 6 wherein said composite resonator includes an exciting resonator means rigidly bonded to a resonating surface and wherein said resonating surface is exposed and impervious to said liquid maintained at a pressure of at least 3000 pounds per square inch.

8. An ultrasonic gauge as in claim 7 wherein said transducer assembly comprises:
   a high pressure plug that has been bored out to a depth leaving a remaining plug wall thickness sufficient to withstand pressures in excess of 3000 pounds per square inch wherein said remaining plug wall thickness serves as said resonating surface; and
   said exciting resonator means rigidly bonded to said remaining plug wall thickness wherein when said transducer assembly is sealed in the base of said storage vessel, said exciting resonator means is protected from said liquid maintained at said pressure in excess of 3000 pounds per square inch.

9. An ultrasonic gauge as in claim 8 wherein said exciting resonator means is a conventional transducer element.

* * * * *